Patented Apr. 11, 1950

2,503,268

UNITED STATES PATENT OFFICE 2,503,268

ART OF STABILIZING ROSIN

Torsten Hasselstrom and Edward A. Brennan, Savannah, Ga., assignors to G and A Laboratories, Inc., Savannah, Ga., a corporation of Georgia No Drawing. Application July 15, 1941, Serial No. 402,562

14 Claims. (Cl. 260—106)

It is well known in the art that ordinary rosin, with its usual characteristics of acid number 163 and melting point 82 degrees C., is not stable in the atmosphere, but changes in characteristics and increases in weight. Further, it is known that such rosin is not suitable for making a cold-set grease.

It has already been proposed to accomplish stabilization of rosin by heating the same to an elevated temperature whereby a disproportionation of hydrogen in the original rosin molecule is effected, and the original resin acids of the abietic type $C_{20}H_{30}O_2$ are at least in part converted into dehydroabietic acid $C_{20}H_{28}O_2$ which is more stable; and it has also been proposed to employ a catalyst such as iodine in order to provoke this disproportionation at a low temperature where the decarboxylization can be maintained at a minimum and losses by way of formation of hydrocarbons avoided.

It has now been found that such rosin can be stabilized by the action of an element of the sulphur group which acts as a dehydrogenating agent or catalyst under certain conditions of concentration, time, and temperature of reaction.

This reaction differs from vulcanization procedures in which sulphur is introduced to the molecule, usually at an unsaturated bond, whereas the present procedure does not produce any substantial degree of sulphurization of the molecule.

In performing the operation, gum or wood rosin, abietic acid, sapietic acid, or crude materials containing the same, are heated to molten condition (e. g., about 140 degrees C.), about 3 percent of sulphur is added, and the reaction mixture is maintained preferably at a temperature of about 220 degrees C. for a time of about 2½ hours. The rosin obtained by such a treatment is stable against oxidation under ordinary atmospheric condition. This proportion, temperature and time can be modified; and it is also feasible to employ, instead of sulphur, another element of this group which includes selenium and tellurium and agents which liberate sulphur or act as sulphur under conditions of the reaction, such as sulphur chloride and other halides, sulphur dioxide, etc. Where these substances are gaseous, or easily volatile at the temperature of reaction, it is preferred to conduct the process under pressure, with a bubbling of the agent through the molten mass.

This stable rosin may be employed as a grease-setting medium for cold-set greases; it may be used in soaps, adhesives, rubber compounds, etc., and other places where a stable rosin is desirable. When employed for chewing gum, it is preferred to effect a further elimination of odor by using air or an inert gas as a bubbling agent during or after the course of the treatment, to eliminate reaction products or undesirable odors: although in many instances the residual odor of the final product can be directly counteracted by admixture of essential oils. When employed in rubber compounds, the maintenance of the residue of sulphur is often desirable, to assist in the curing of the rubber compound.

In the experimental work, it has been found that the nature of the change in the rosin is such that the stability is improved in parallelism with the ability to set a grease; and that when the acid number has not substantially changed, a prediction of the stability of the rosin may be quickly made from the behavior of the stabilized rosin in a grease-setting test.

As examples of practice may be set out the following, which are illustrative of the results obtainable:

Example I.—Low temperature 500 grams of gum rosin were heated to 180 degrees C., and seven percent of sulphur was added. A temperature of 180 degrees C. was maintained for one hour and a grease set, indicated by a very hard grease in six seconds, showed that a conversion to a stabilized rosin had been made.

The product obtained was sulfonated in the usual proportions and a high yield of sulfonic acid was obtained.

It has been found that heating to 170 degrees C. appears a lower limit for commercial operations, with a content of 15 percent of sulphur and 35 minutes heating time. This product retains a large proportion of the sulphur and gives a sulphurized type of grease. In general, the amounts of catalyst, the temperature, and the time of reaction should be chosen in relation to one another, so that less than 10 percent of decarboxylization occurs.

Example II.—maximum temperature 500 grams of wood rosin was heated to 140 degrees C., and one percent of sulfur was added. The temperature was then raised to 300 degrees C. and maintained for two hours. The product had an acid number 141 and melting point 69 degrees C. A grease was set which was fair. The sample was discarded because of the extensive breakdown in acid number due to the high reaction temperature. As pointed out above, the decarboxylization should be maintained low, as the heat treatment of the rosin produces neutral abietenes which are not stable to oxidation. The acid number should not be reduced substantially below 150, as the lower products represent an excessive degeneration, with the formation of such hydrocarbons. Without a catalyst present, the decrease of acid number is very rapid above about 240 degrees C., corresponding to destructive distillation. When heated to this temperature in the presence of sulphur as a catalyst, the conversion-ability of the sulphur appears to suffer, and instead accelerated decarboxylization occurs. In particular, heating at 300 degrees C. with 1 percent of sulphur for one hour appears a maximum limit at which a commercially acceptable product is obtainable; and it is always preferable to operate at below about 240 degrees C.

Examples III, IV and V.—Concentration

Three 500 gram batches of wood rosin were treated with one percent, three percent and nine percent of sulfur at 220 degrees C. for two hours. The one-percent product made a poor grease indicating that this low percentage of sulfur does not effect a commercially feasible stabilization. Three percent and nine percent products set a good grease. Upon determination of the properties of the products, it was found

|  | Acid number | Melting point |
|---|---|---|
|  |  | Degrees C. |
| #3 One percent | 160.6 | 78 |
| #4 Three percent | 159 | 79 |
| #5 Nine percent | 152.5 | 81 |

Examples VI and VII.—Effect of vessel 500 grams of wood rosin were placed in a glass flask equipped for introduction of carbon dioxide into the rosin. One percent of sulphur was added, and the contents treated at 220 degrees C. for two hours with a constant stream of carbon dioxide entering. The color was maintained. 500 grams of wood rosin were also heated at 220 degrees C. for two hours in an aluminum pot with one percent of sulphur with a constant stream of carbon dioxide. The color was one grade darker than in Example VI. Upon testing for stability by subjecting to the action of oxygen for 92 hours, it was found:

| Stability | Gain, total |
|---|---|
| #6 $CO_2$ treated | plus .0420 gr. |
| #7 Aluminum pot | plus .0451 gr. |
| Wood rosin (untreated blank) | plus .1796 gr. |

Examples VIII, IX and X.—Concentration and time

Three 500 gram samples of wood rosin were treated in glass with one percent, two percent and three percent of sulphur at 220 degrees C. for five hours, three hours and two and one-half hours.

On testing the products by exposure to oxygen for 44 hours, it was found

| Stability | Gain, Total |
|---|---|
| #8 One percent sulphur—5 hours | plus .0205 gr. |
| #9 Two percent sulphur—3 hours | plus .0096 gr. |
| #10 Three percent sulphur—2½ hours | plus .0053 gr. |
| Wood rosin (untreated blank) | .0810 gr. |

It will be noted that a higher degree of stability was obtained than in Examples VI and VIII.

Examples XI and XII.—With iodine

Four 500 gram samples of wood rosin were heated to 200 degrees C., and catalysts were added in the following manner:

11 .9 sulphur and .1 iodine added
12 .9 sulphur and .1 iodine added
13 .6 sulphur and .1 iodine added
14 .4 sulphur and .1 iodine added The temperature was maintained for two hours. Upon testing the products, it was found:

|  | Acid number | Melting point |
|---|---|---|
|  |  | Degrees C. |
| #11 | 160.5 | 74 |
| #12 | 159.8 | 72 |
| #13 | 161.7 | 73 |
| #14 | 161.2 | 73 |

Examples XIII, XIV and XV.—Color changes

Three 500 grams of wood rosin were heated to 220 degrees C. and treated in the following manner:

15 .9 sulphur and .1 iodine
16 .8 sulphur and .2 iodine
17 .6 sulphur and .4 iodine This temperature was maintained for two hours. Upon examining the products for color, it was found:
15 N Color maintained
16 K Two grades drop
17 I Three grades drop Apparently the deepening of color was a function of the quantity of iodine utilized.

Similarly, it has been found feasible to mix sulphur with crude talloel and heat to a temperature of 200 to 220 degrees C. for two hours, with a stabilization of the talloel so that it no longer accepts oxygen from the air at a high rate.

The stability tests were carried out in the following manner: A 5 gram sample of each of the above materials collected on a watch glass was kept in a stream of oxygen for the stated times and the weight increase recorded. The blank or control test was performed upon the raw, untreated, original material.

The grease setting tests were carried out in the following manner: Seven and one-half grams of the resin to be tested are dissolved in twenty-two and one-half grams of mineral oil (preferably 100 seconds viscosity Saybolt Universal at 100 degrees F.). This mixture, after cooling to 40 degrees F., is added to 70 g. of a saponifier made up of twenty-five percent calcium hydroxide and seventy-five percent of the same type of mineral oil as described above. The mixture is stirred until there is a definite set sufficiently firm enough to permit the spatula used for stirring to remain rigid in the center of the grease without falling over. In this procedure, a continuance of the stirring beyond this point has no appreciable influence upon the apparent behavior of the specimen. The stiffness of the grease-set does not change very much with temperature, but rather with the rapidity by which the grease "sets." A standard condition was established, however, by choosing 40 degrees F. as a standard temperature, so that direct comparisons could be made, with the elimination of the possible variable.

A general comparison of the products may be made by grouping them into four categories: a good set with a hard stiff grease; a fair set with a stiff grease; a poor set where thickening only progresses to a "sloppy" condition; and a bad set where essentially no grease thickening is produced.

Rosin stabilized in the above manners can be sulfonated in accordance with Hasselstrom Patents 2,121,032 and 2,121,033. When the treatment was at 200 degrees for 2 hours with 7 percent of sulphur, a yield of 25 percent of sulfodehydroabietic acid was obtained.

The action also occurs in the presence of materials other than natural rosin which contain end radicals of abietic acid of the $C_{20}H_{30}O_2$ or Steele's abietic acid type: thus talloel, rosin esters, etc., may be subjected to the treatment.

A maximum of 15 percent of sulphur can be employed, for instances where it is desired to retain a considerable amount of sulphur in the final product, and where the action is to be accomplished at a relatively low temperature. For example, heating for one hour at 170 degrees C. gives a fair grease-set.

The stability of the material thus produced is indicated by Examples VI to X above. It has been found that determinations of the iodine number or the acid number cannot be directly employed to ascertain the unsaturation or conversion to a more stable form but are valuable on a comparative basis for following the course of the interactions. Thus, the transition from Steele's abietic acid to dehydroabietic acid occurs without decarboxylization, and hence with essentially no change in either iodine number or acid number: any change in these physical values indicates a decomposition, for example, by way of decarboxylization to abietenes which are more unstable than the rosin itself, and is further obscured by the nature of the substances present. The treatment with oxygen has been found satisfactory for indicating stability with these various stabilized rosins and, as set out above, it has been noted that this behavior parallels the grease-setting capability of the stabilized product. The material of the reaction vessel plays a part in determining the characteristics of the stabilized rosin. When the stabilization is effected in glass, enamel or other like vitreous non-metallic material, the product is lighter in color than when aluminum is employed; while iron and copper vessels lead to the production of a dark rosin. It is to be assumed that this darkening is due to a partial solution of the metal, by the acid contents of the reaction mixture at the high temperature, possibly with a further conversion of the metal to a sulphide form.

It is desirable to conduct the conversion under pressure when the agent is gaseous or has a high volatility at the temperature of reaction: hence, when the conversion with iodine is to be provoked at a temperature above 184 degrees C., pressure is desirable to detain the iodine in contact with the material. The actual pressures employed will vary, but it is desirable to employ pressures of several atmospheres.

It has been noted that for a given temperature, a reciprocal relationship appears between the concentration of catalyst and the time of the reaction, for obtaining similarity in final product. Thus, at a temperature of 220 degrees, the product of time (in hours) and concentration (in percent) should have a numerical value above 5, but apparently little advantage is attained in operations at above 30. At a temperature of 300 degrees, a value of 2 is excessive. At 170 degrees, conversions have been attained at values of 7 to 15 which were fair, and it is then preferred to utilize even higher values.

During the course of the reaction, hydrogen sulphide is formed, and escapes. In Examples VI and VII above, carbon dioxide was passed through the mixture during the treatment, and served to eliminate this reaction gas.

It is not presently believed that the carbon dioxide itself takes part in the reaction, but it has a definite value in depressing the carbon dioxide evolution by decarboxylation, and in eliminating the hydrogen sulphide as an end product of the desired conversion. Other inert gases, including steam or superheated steam, nitrogen, etc., may also be employed.

It has likewise been found possible to pass air through the reaction material, for eliminating the sulphide gases, and also with the apparent effect of facilitating the action of the sulphur itself, possibly by the effect of the oxygen in the air. It is further recommended, where maximum freedom from odor is specified, to continue the passage of carbon dioxide, air, nitrogen, or the like through the molten material while it is at a temperature below 170 degrees, so as to wash out the volatile reaction products so far as possible. When this blowing is conducted with air at a temperature of slightly above the melting point, it is feasible to eliminate a major part of converted and unconverted sulphur without excessive modification of the stabilized rosin itself.

Substantially the same quantities of selenium or tellurium can be employed, but owing to costs, it is presently preferred to employ sulphur when an elemental body is utilized. However, this sulphur need not be purified in normal fashions, as the presence of selenium and tellurium as impurities has no retarding effect upon the conversion and, indeed, may have an accelerating action upon it.

In the conduct of the experimental work, it was noted that in some instances the melting point of the final product was slightly higher than that of the original rosin material.

It is obvious that the foregoing illustrative practices are not restrictive, and that the invention may be employed in many ways without departing from the scope of the appended claims.

We claim:

1. The process of producing stabilized abietyl compounds which comprises heating abietyl compounds with up to about 10 percent of sulfur at a temperature above 200 degrees C.

2. The method of stabilizing abietic acid, which comprises heating the same to a temperature of substantially 170 to 300 degrees C. in the presence of up to 15 percent substance selected from the group consisting of the elements sulphur, selenium and tellurium and their reducible di-oxides and halides whereby to provoke the formation of a hydrogen compound of said element at the expense of hydrogen from the abietic acid, and terminating the heating after at least 35 minutes and prior to the degeneration into abietenes of 10 percent of the said acid and prior to reduction of the acid number below 150.

3. The method of stabilizing rosin which comprises heating the rosin material to a temperature of substantially 170 to 300 degrees C. in the presence of substantially 1 to 3 percent of a substance selected from the group consisting of sulphur, selenium and tellurium and their reducible di-oxides and halides whereby to provoke the formation of a hydrogen compound of said element at the expense of hydrogen from the abietic acid, effecting the elimination of said hydrogen compound, and terminating the heating prior to the degeneration into abietenes of 10 percent of the rosin acid and prior to any substantial sulfurization, oxidation or decarboxylization of the abietic acid of said rosin material.

4. The process of stabilizing compounds containing the radical of Steele's abietic acid, which comprises heating the same with up to 15 percent of sulphur at a temperature of 170 to 300 degrees C., and terminating the heating while the acid number is still above 150 and the amount of degeneration of said compound into abietenes is less than 10 percent, the product of the time of treatment in hours multiplied by the percentage of sulphur being from 1 to 30 and varying with the temperature of treatment, said product being less than 2 at 300 degrees C., being at least 5 at 220 degrees C., and being at least 7 at 170 degrees C.

5. The process of stabilizing compounds containing the radical of Steele's abietic acid, which comprises heating the same with 1 to 9 percent of sulphur at a temperature of 170 to 240 degrees C., and terminating the heating while the acid number is still above 150 and the amount of degeneration of said compound into abietenes is less than 10 percent, the product of the time of treatment in hours multiplied by the percentage of sulphur being from 2 to 30 and varying with the temperature of treatment.

6. The method of stabilizing compounds containing the radical of Steele's abietic acid, which comprises heating the same to a temperature of substantially 180 to 200 degrees C. in the joint presence of about 0.9 percent sulphur and about 0.1 percent iodine and while confining the same under pressure of at least 15 pounds per square inch, terminating the heating while the acid number is still above 150 and prior to any substantial sulfurization, oxidation, or decarboxylization of the abietic acid of said rosin material, and effecting the elimination of hydrogen sulphide.

7. The method of stabilizing rosin to produce a light-colored rosin, which comprises heating the rosin material to a temperature of 170 to 240 degrees C. in the presence of 1 to 3 percent of sulphur for a time dependent upon the operating temperature with the product of the time in hours multiplied by the percentage of sulphur being from 5 to 30, and while confined by surfaces of glass and like vitreous non-metallic substances, effecting the elimination of the gaseous hydrogen sulphide and terminating the heating prior to reduction of the acid number of said rosin material below 150.

8. The method of stabilizing rosin, which comprises heating the rosin material to a temperature of 170 to 300 degrees C. in the presence of up to 15 percent of sulphur for a time of 35 minutes to five hours, while bubbling carbon dioxide through the mass, and terminating the heating prior to reduction of the acid number below 150.

9. The method of stabilizing rosin, which comprises heating the rosin material to a temperature of substantially 170 to 240 degrees C. in the presence of substantially 3 percent of sulphur and while bubbling an inert gas through the reaction material to eliminate hydrogen sulphide and terminating the heating prior to degeneration of 10 percent of the abietic acid to abietenes.

10. The method of stabilizing rosin, which comprises heating the rosin material to a temperature of substantially 170 to 240 degrees C. in the presence of substantially 3 percent of sulphur, and bubbling oxygen through the reaction mixture to eliminate hydrogen sulphide and terminating the heating prior to degeneration of 10 percent of the abietic acid to abietenes.

11. The method of stabilizing compounds containing the radical of Steele's abietic acid, which comprises heating the compound at a treatment temperature of 170 to 300 degrees C. in the presence of up to 15 percent of sulphur, for a time of at least 35 minutes, terminating the heating prior to degeneration of 10 percent of the compound to abietenes, and thereafter bubbling an inert gas through the molten reaction mixture at a temperature below the treatment temperature whereby to eliminate hydrogen sulphide.

12. The method of stabilizing rosin, which comprises heating the rosin material to a temperature of substantially 180 to 240 degrees C. in the presence of sulphur and iodine for about 2 hours, the total quantity of said reagents being substantially 1 percent by weight, with the weight of the iodine being less than the weight of the sulphur, and terminating the heating prior to reduction of the acid number below 150.

13. The method of stabilizing rosin, which comprises heating the rosin material to a temperature of 170 to 300 degrees C. in the presence of substantially 3 percent of an element selected from the group consisting of sulphur, selenium and tellurium and their reducible di-oxides and halides whereby to provoke the formation of a hydrogen compound of said element at the expense of hydrogen from the abietic acid, for at least 35 minutes and until a major part of the abietic acid content has been converted into dehydro-abietic acid, permitting the hydrogen compound of said element to escape, and terminating the said heating prior to reduction of the acid number to below 150, cooling the reaction material, and bubbling inert gas through the molten stabilized rosin material at a temperature not exceeding substantially 170 degrees C. whereby to effect elimination of the gaseous hydrogen compound of said element.

14. The process of stabilizing compounds containing the radical of Steele's abietic acid, which comprises heating the same with about 3 percent of sulphur at a temperature of 220 degrees C., and terminating the heating while the acid number is still above 150 and the amount of degeneration of said compound into abietenes is less than 10 percent.

TORSTEN HASSELSTROM.
E. A. BRENNAN.

(References on following page)

REFERENCES CITED

The following references are of record in the file of this patent:

UNITED STATES PATENTS

| Number | Name | Date |
|---|---|---|
| 375,405 | Wilhoft | Dec. 27, 1887 |
| 1,957,788 | Lister | May 8, 1934 |
| 1,980,367 | Auer | Nov. 13, 1934 |
| 2,042,035 | Brennan et al. | May 26, 1936 |
| 2,052,210 | Borglin et al. | Aug. 25, 1936 |
| 2,111,882 | Borglin et al. | Mar. 22, 1938 |
| 2,161,066 | La Lande | June 6, 1939 |
| 2,204,538 | Lincoln et al. | June 11, 1940 |
| 2,217,764 | Morway et al. | Oct. 15, 1940 |
| 2,225,246 | Hasselstrom | Dec. 17, 1940 |
| 2,285,458 | Pragoff | June 9, 1942 |

FOREIGN PATENTS

| Number | Country | Date |
|---|---|---|
| 629,213 | France | Feb. 17, 1927 |

OTHER REFERENCES

Ruzick et al.: Helvetica Chimica Acta, vol. 5, 1922, pp. 586 and 587.

Palkin: Journ. Chem. Educ., Jan. 1935, pp. 37 and 38.

Diels: Ber. Deut. Chem. Ges. Jg. 60 Bd. 2, Abt. B, 1937, p. 2324.

Fieser et al.: Journ. Amer. Chem. Soc., vol. 60, Nov. 1938, pp. 2631 and 2632.